W. H. CAMP.
ATTACHMENT FOR LINTING AND DELINTING MACHINES.
APPLICATION FILED OCT. 21, 1912.
1,089,318.
Patented Mar. 3, 1914.
3 SHEETS—SHEET 3.
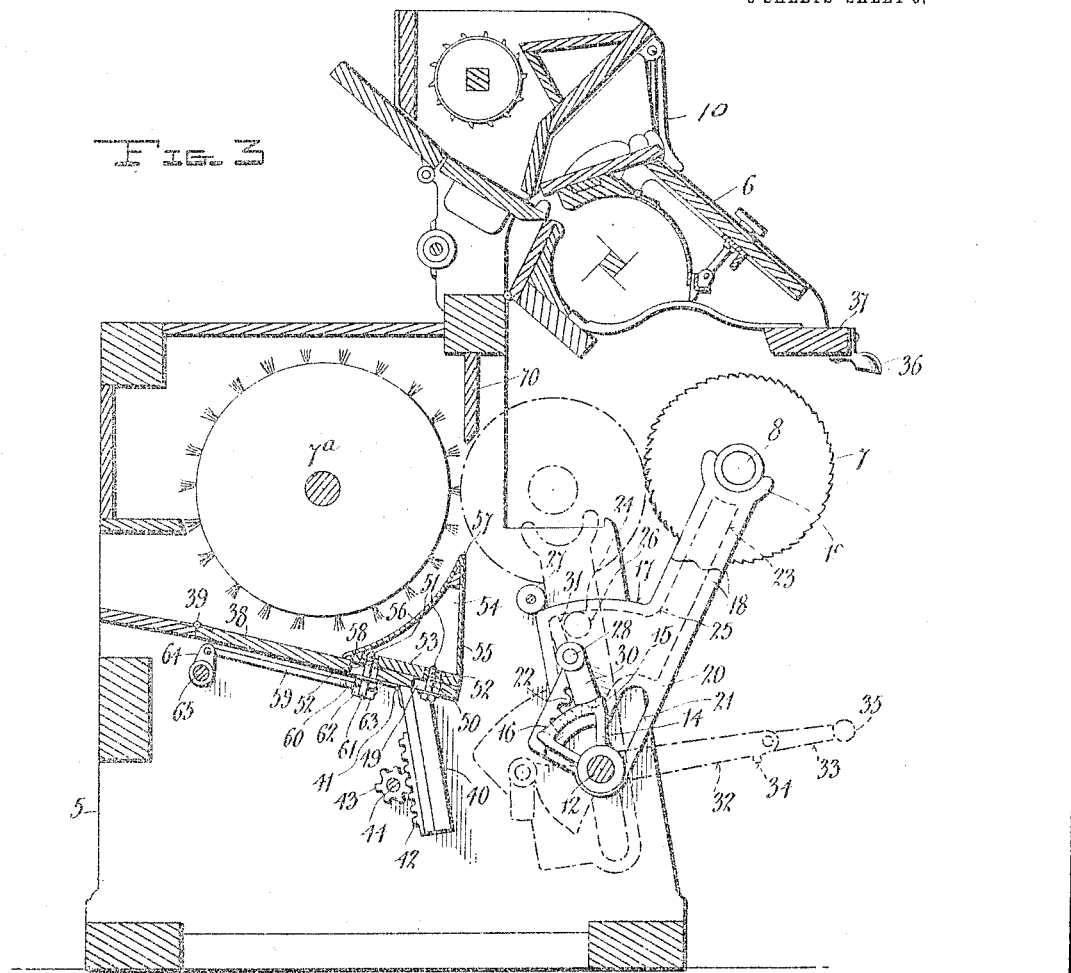
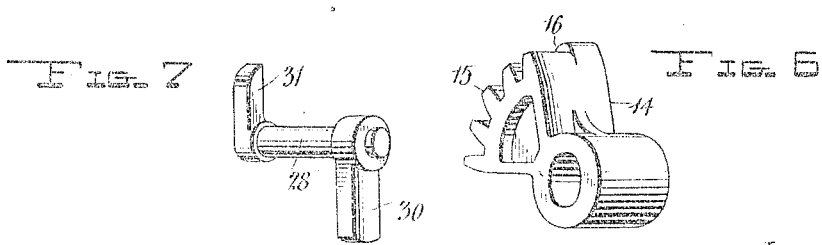
Witnesses,
Inventor
Warner H. Camp,
by
Attorney.

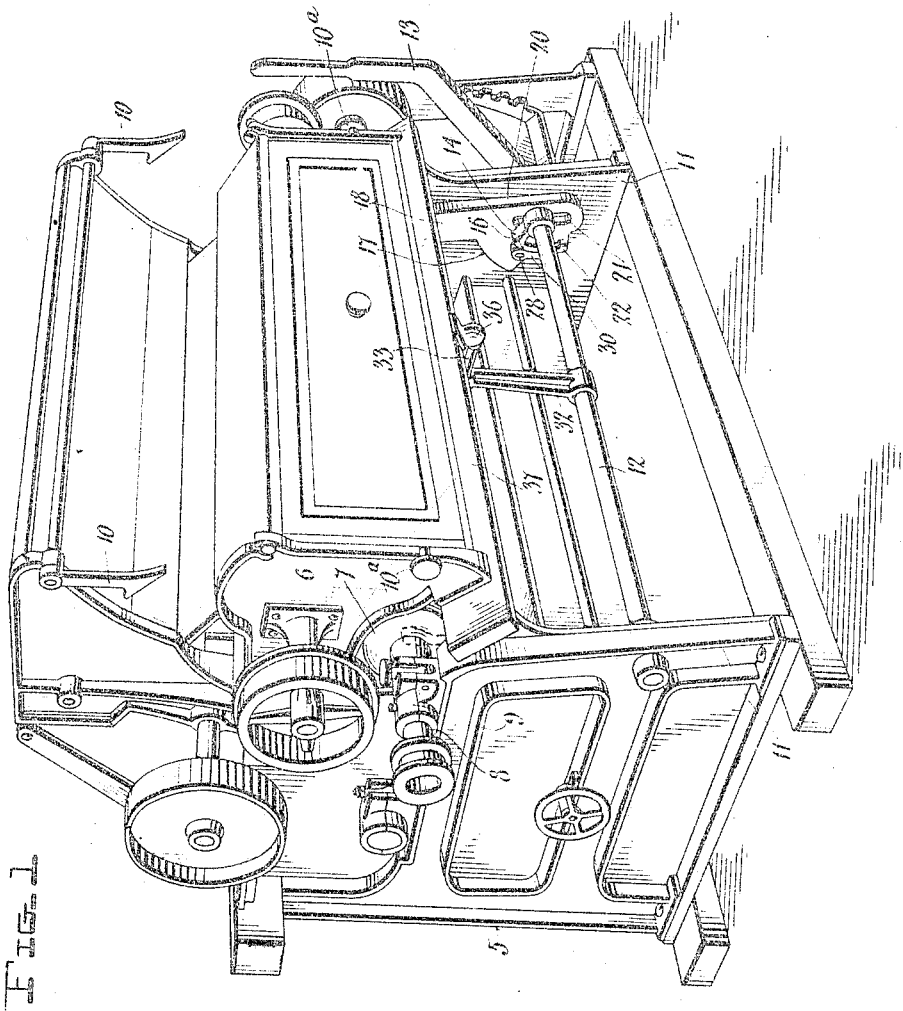

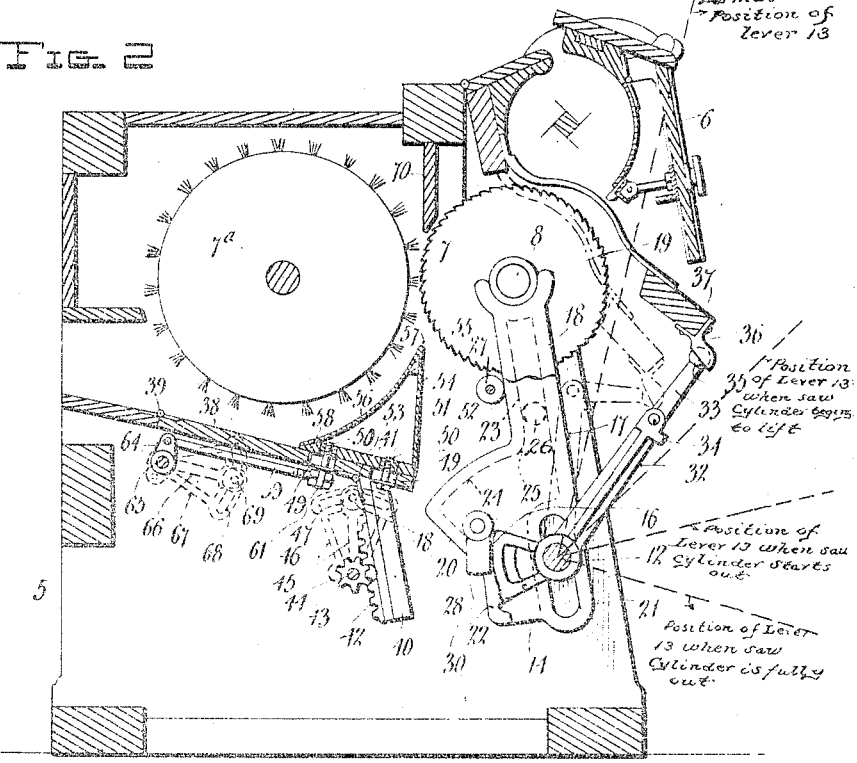

UNITED STATES PATENT OFFICE.

WARNER H. CAMP, OF ATLANTA, GEORGIA.

ATTACHMENT FOR LINTING AND DELINTING MACHINES.

1,089,318. Specification of Letters Patent. Patented Mar. 3, 1914.

Application filed October 21, 1912. Serial No. 727,031.

*To all whom it may concern:*

Be it known that I, WARNER H. CAMP, a citizen of the United States, residing at Atlanta, in the county of Fulton and State of Georgia, have invented new and useful Improvements in Attachments for Linting and Delinting Machines, of which the following is a specification.

This invention relates to means for removing and replacing the saw cylinders of cotton seed linting or delinting machines and for adjusting the mote board organization relatively to the brush cylinder and saw cylinder.

Heretofore the operation of removing and replacing heavy saw cylinders of cotton seed linting or delinting machines required the services of two or more operatives, and it is obvious that where a great many machines are included in a battery the time incident to the removal and replacement of the saw cylinders is considerable and is rather expensive where the services of the operatives thus employed are prevented in and about other places of a linting or delinting plant.

The main advantage of the improved means is that one operator may readily remove and replace the saw cylinder with a material saving in expense and time incident to such operations and without liability of injury either to the operator or the saw cylinder.

A further advantage of the improved linting or delinting machine is that the mote board as an entirety or parts thereof may be readily adjusted to dispose the same as may be desired relatively to the brush and saw cylinders to suit or accommodate any conditions, and to mote and make the lint as clean as desired.

A further advantage of the improved means or mechanism is that application thereof to linting or delinting machines when the latter are primarily constructed or to the same kind of machines that have been in use may be readily accomplished at a comparatively small expense with a material reduction in the cost of maintaining the machines in proper operative condition.

Other advantages will be hereinafter specified, and in order to present a disclosure of the invention the accompanying drawings illustrate one preferred embodiment of the improved means or attachment, and in the drawings: Figure 1 is a perspective view of a linting or delinting machine with the features of the invention applied thereto. Fig. 2 is a transverse vertical section through the machine and particularly showing the position of the cylinder removing means or mechanism when starting to lift the saw cylinder for the purpose of removing or when replacing said saw cylinder in its bearings and also illustrating the improved mote board organization. Fig. 3 is a view similar to Fig. 2 showing the saw cylinder elevated and thrown outwardly by the improved mechanism and the breast also elevated and held by engaging means therefor. Fig. 4 is a detail perspective view of one of the cylinder lifting forks and its component parts. Fig. 5 is a detail perspective view of one of the segment members for coöperating with the fork. Fig. 6 is also a detail perspective view of one of the segment members looking at the side of the same opposite that illustrated by Fig. 5. Fig. 7 is a detail perspective view of a locking attachment which coöperates with the segment.

The cotton seed linting or delinting machine 5 may be of any preferred construction and embodies the usual hinged or elevatable and depressible breast 6 and comprising the roll box and ribs with which the saw cylinder directly coöperates. The saw cylinder 7 has its shaft 8 mounted at opposite extremities in the usual form of separable boxes or journals 9 and in order to hold the breast and its components elevated, suitable gravitating catches 10 are applied to the upper part of the machine to engage headed studs 10ᵃ at opposite ends of the breast, as shown by Fig. 1. A brush cylinder 7ᵃ is associated with the saw cylinder 7 as usual to remove the lint from the latter cylinder.

In the lower front portion of the legs 11 of the frame a shaft 12 is mounted and has an operating lever 13 of angular form secured to one end thereof, as clearly shown by Fig. 1, the said operating lever being so shaped as to stand close to the machine when in normal position and also to effect a reliable and positive actuation of the shaft 12 by an operator. Secured on the shaft 12 adjacent to the inner side of each leg is a toothed segment 14, each of the segments being provided with a line of teeth 15 and a cam or bearing edge 16, as clearly shown in detail by Figs. 4 and 6. Close to the inner side of each leg a saw cylinder engaging fork 17 is movably mounted and is of the form shown in detail by Fig. 5, this fork comprising an upwardly extending arm 18 with an upper forked extremity 19 to bear against the under side of the shaft 8 of the saw cylinder, and a lower body 20 having a longitudinal slot 21 at one side of the center through which the shaft 12 extends, each fork having a free sliding movement over the latter shaft. On the body 20 is a rack 22 having a suitable number of teeth and extending parallel with the slot 21, the said rack 22 standing outwardly from the body adjacent to the inner side edge of the latter, whereas the slot 21 is near the outer side edge of said body.

The outer side of each fork member is formed with a recess or roller depression 23 continuing upwardly into the arm 18, as shown, and having an upper arcuate edge 24 in the body, said edge having a different arcuate curvature adjacent to the point where it merges into the portion of the recess or depression that extends upwardly into the arm 18, as at 25, for a purpose which will be presently explained. A movement controlling roller 26 is mounted on the inner side of each leg and extends into the recess or depression 23, the depth of the latter being equal to the thickness of the roller so that the roller is inclosed by the leg member and always retained in the recess or depression 23. A guide roller 27 is also mounted on the inner side of each leg and its function is to direct the arm 18 in its upward movement and conjointly cooperate with the roller 26 to maintain the fork member in place during the elevation and depression of said member so that the fork 19 will always be brought to bear with accuracy against the under side of the shaft 8 of the saw cylinder 7 to elevate and throw the latter outwardly and also to direct the movement of the fork when replacing the saw cylinder and to effect an accurate resetting of the fork in normal position when the cylinder is replaced without imposing undue strain on the lower portion of the fork member, especially on the segment 17 and the rack 22 which are always in mesh. It will be understood that the teeth of the rack and of the segment are heavy enough to withstand considerable weight pressure, and through the medium of the segment the fork is raised and lowered. Secured to the upper terminal of the rack 22 and the body 20 of the fork member is a locking device comprising a spindle or pin 28 freely movable in an opening 29 formed in the upper end of the rack and extending through the body 20, the said spindle or pin 28 having a locking dog 30 on the inner end thereof and a trip arm or projection 31 on the outer end, the said trip arm or projection being located within the lower portion of the recess 23 and housed or inclosed by the fork member. The dog 30 and trip arm 31 respectively project below and above the spindle or pin 28 and the dog is set in locking position by the roller 26 when the latter comes into that portion of the recess 23 which is formed in the body 20 and at the time that the upper curved wall 24 of said recess moves over the roller. The dog 30 is so arranged that it will engage the cam or bearing edge 16 of the segment and lock the latter when the saw cylinder is completely elevated and thrown outwardly and at this time the trip arm 31 will be engaged by the roller 26 and held firmly for the reason that the greater weight or portion of the trip arm will be outward or past the axis of its movement, said axis being the shaft 12. This engagement of the trip arm 31 by the roller 26 takes place when the fork has reached its highest elevation and the dog 30 locks the segment against movement or prevents it from becoming disengaged from the rack, and the fork arm as a whole together with the rack and segment will then be caused to swing with the shaft, such condition being practically expedient in swinging the saw cylinder outwardly and inwardly in the removing and replacing operations. The locking association of the dog 30 with the cam or bearing edge 16 of the segment 14 continues until the roller 26 reaches the varying arcuate portion 25 of the upper wall 24, and when the said roller strikes this bearing arcuate portion, the arm 31 is tripped and disengages the dog 30 from the cam or bearing edge 16 and permits the segment teeth 15 to operate with the teeth of the rack 22 and gradually lower the fork member. When the fork or arm carrying the saw cylinder is raised by the toothed segment 14, the said fork or arm cannot rotate outwardly to the position shown in full lines by Fig. 3 until the toothed segment 34 has raised sufficiently or so that the roller 26 will pass the point of intersection of the innermost wall of the recess or depression 23 with the arcuate edge 24, and as this point of intersection of the arcuate edge 24 and inner wall of the recess or depression 23 has a different arcuate contour from the said edge 24 as hereinbefore noted, the dog 30 will be caused to swing clear of the teeth in the segment 14, but the dog 30 will not take the position shown in full lines in Fig. 3 until the fork or arm carrying both the dog and cylinder has been rotated to its outward position by the continued rotative movement of the shaft 12, as shown in full lines in Fig. 3, and until the roller 26 has come in contact with the fork or arm 31 attached to the dog 30, and through said operation of the roller 26 the dog 30 is forced into the position shown in full lines in Fig. 3 or in locking engagement with the upper outer portion of the cam or bearing edge 16. On returning the saw cylinder into place by means of the foregoing mechanism the dog 30 remains in the position shown in full lines in Fig. 3 with relation to the fork or arm engaging the cylinder and the toothed segment 14 until the roller 26 strikes or engages the intersecting point 25 between the arcuate edge 24 and the inner wall of the recess or depression 23, and when the said roller reaches this position the fork or arm will be slightly lifted and the dog 30 thereby released and immediately swing by gravity into the position shown by full lines in Fig. 2 and permitting the fork or arm, together with the rack, to be depressed and finally restored to normal position by the continued operation of the shaft 12 in an outward direction and at the same time lower the saw cylinder shaft or spindle to its bearings and permit the roll box, including the breast, to be depressed and become engaged with the upper end of the lever 33, as shown in full lines by Fig. 2. This particular operation takes place uniformly adjacent to each leg 11 of the machine and by this means the opposite shaft extremities of the saw cylinder are equally raised and lowered and when the fork members are lowered the rollers 26 on each leg 11 moves upwardly into those portions of the recesses 23 projecting longitudinally of the arms 18 of the said fork members.

Near the center of the shaft 12 a knuckle joint is fixed and comprises a lever arm 32, to the outer end of which a shorter knuckle arm 33 is pivotally attached and limited in its outward movement by a shoulder or projection 34 at the outer side of the upper end of the lever arm 32, the outer end of the knuckle arm 33 having a spherical or ball terminal 35 and socket member 36 secured to the rib rail 37 of the breast 6 of the machine. When the operating or hand lever 13 is pulled forward about thirty degrees this knuckle joint straightens out and lifts the breast, including the ribs, away from the saw cylinder, as shown by Fig. 2, so as to clear these parts of the machine from the saw cylinder preliminary to the movement of the latter in a manner which will be more fully hereinafter explained. The stop shoulder or projection 34 on the outer upper portion of the lever arm 32 prevents the knuckle arm 33 from being depressed below a right angle relatively to the lever arm 32 so that the knuckle arm is always in position to insure its positive operation or straightening out movement relatively to the said lever arm for the purposes specified.

The mechanism just explained for removing and replacing the saw cylinder of a cotton seed linting or delinting machine may also be utilized for exposing the saw cylinder without removing the same, and for this purpose the operating or hand lever 13 is pulled outwardly so as to turn the shaft through about thirty degrees, this movement of the shaft causing the forks 17 at each end to rise until the upper forked terminals 19 just touch the collars of the saw cylinder, and this movement also throws open the breast through the medium of the knuckle joint and thereby clears the saws and exposes the latter for any purpose that may be desired. If the removal of the saw cylinder is required, the opposite extremities of the saw cylinder shaft are released by opening the bearing devices therefor and the lever 13, together with the shaft 12, is then pulled outwardly sixty additional degrees or the lever is caused to move through a total arc of ninety degrees, which will lift the saw cylinder clear of its bearings and permit it to be swung outwardly, as shown by Fig. 3, over a saw cylinder truck ordinarily used for handling saw cylinders, and when another similar truck containing a cylinder is brought into position relatively to the machine, the cylinder thereon may then be caused to engage the upper forked extremities 19 and the fork members thrown back and finally lowered to dispose the substitute cylinder in the bearings therefor. This work may be carried on solely by one operative. When the breast is raised to the full operating extent of the knuckle joint, it is further elevated by hand, and it will be understood that the gravity hooks 10 coöperate with the breast, by catching over the studs on the ends of the breast casting and prior to lowering the fork members the breast will be released by disengaging the hooks therefrom.

The segments 14 practically operate as pinions and it would not require any variation of the invention to use complete pinions instead of these segments, but as only a portion of the teeth of the complete pinion would operate with the racks it has been found that the segments as shown serve the purpose of the intermediate motion transmitting means between the shaft and the racks and are more advantageous. The lifting fork members are not effective while the hand lever is moving forwardly through the first thirty degrees from its normal position. This preliminary movement of the hand lever operates to raise the breast and ribs clear of the saws, but such preliminary movement of the hand lever brings the lifting fork members up to such position that any further travel or outward movement of the hand lever will tend to lift the saw cylinder out of place. During this preliminary movement the roller 26 does not become disengaged from the portion of the recess 23 extending upwardly into each lifting fork member, and only when the second outward thirty-degree movement of the hand lever is effected does the said roller pass into the lower enlarged portion of the recess 23 and each fork will then be in condition for swinging outwardly to deposit the saw cylinder carried thereby on the usual cylinder truck or any other device, as may be desired. When releasing the locking means and at the time when the roller strikes the different arcuate portion of the upper edge 24 of the recess in the body 20 of the fork member, the fork member is free to be slightly raised to release the lock and the lock swings out of the way by gravity.

The improved attachment will be found exceptionally advantageous in that it is unnecessary to remove bolts and nuts to open the bearings, the bearings used being preferably of the clamp screw and hinge lid type which can be easily manipulated to release the opposite extremities of the saw cylinder shaft and the single lever then operated to remove the saw cylinder. Furthermore, by supporting the breast on the catch hooks as explained, the necessity of dismounting and removing the breast is avoided and the improved attachment or means for lifting and removing the saw cylinder also dispenses with the use of the ordinary form of cylinder hoist and also the work of extra operatives. By eliminating these various disadvantageous features, a cotton seed linting or delinting machine may be more conveniently manipulated, such for instance as keeping the saws sharp and in good condition, and, further, injury to operators by the saw cylinders during the operations of removing and replacing or resetting said cylinders is prevented.

The moting board organization also embodying features of the improvemnt comprises a main moting board 38 hinged as at 39. At the free extremity of the board 38 is a depending member 40 hinged at 41 to the board to accommodate various angles of the latter when adjusted, and on the said member is secured a rack 42 meshing with a pinion 43 on the inner end of a shaft 44 having bearing in one of the legs 11. The shaft 44 extends through the leg 11 and has an operating arm 45 attached to its outer end and disposed adjacent to a locking segment or bracket 46 having a segmental slot 47 engaged by a clamping screw 48 carried by the said arm and whereby the arm, shaft and mote board may be held in any desired fixed position. By rotating the shaft 44 in opposite directions through the medium of the arm 45, the pinion 43 will correspondingly actuate the rack 42 to raise or lower the mote board 38 as may be desired. In the free extremity of the mote board 38, slots 49 are formed and therethrough adjustably extend bolts 50 having their lower headed ends bearing against the under side of the mote board and their upper screw-threaded ends 51 engaging fixed nuts or sleeves 52 mounted in a base 53 of a mote board extension 54, the latter consisting of a hollow sheet metal body with an outer straight wall 55 and an inner arcuate wall 56, the walls 55 and 56 intersecting at their upper edges in a point 57 movable upwardly and downwardly between the saw cylinder 7 and brush cylinder 7ª. The mote board extension 54 serves as a deflector and the motes pass downwardly over or between the inner arcuate wall 56 and the brush cylinder 7ª to the main mote board 38, the inner terminal of the base 53 being beveled or reduced in a curved plane corresponding to that of the inner wall 56, as at 58. The base 53 and the hollow sheet metal body 54 constituting the mote board extension is adjustable inwardly and outwardly over the outer or free extremity of the mote board 38 through the medium of the bolts 50 moving in the slots 49, such adjustment of the mote board extension being independent of the adjustment of the mote board as a whole, as hereinbefore explained. When the mote board 38 is raised and lowered the extension moves similarly therewith, and to adjust the mote board extension inwardly and outwardly over the mote board 38 a connecting rod 59 has its outer screw-threaded extremity 60 inserted through an opening or eye 61 on the lower end or head of the innermost bolt 50, the screw-threaded extremity 60 of the rod 59 being adjustable in the said eye to preliminarily set the mote board extension 54 as may be desired relatively to the main mote board 38, and to maintain the adjustment, nuts 62 and 63 engage the screw-threaded extremity 60 of the rod 59 and operate as set nuts relatively to the lower extremity or head of the innermost bolt 50. It is preferred that the lower end of the innermost bolt 50 be slightly flattened as shown so as to facilitate the formation of the eye 61 therethrough, but such construction will not in the least defeat its function in serving as a bearing means against the under side of the main mote board 38, suitable washers being interposed between the lower or headed ends of the bolts 50 and the under side of the said mote board 38. The rear end of the rod 59 is connected to a crank arm 64 projecting from a shaft 65 extending through the leg 11 of the machine and also having attached thereto an operating arm 66 associated with a segment 67 having a segmental slot 68 which is engaged by a clamping screw or analogous device 69 carried by the outer end of the arm 66 to maintain the adjustment of the arm 66 and the mote board extension 54 on rod 59 and the main mote board 38. It will be understood that the movement of the arm 66 in opposite directions will correspondingly move the rod 59 and shift the mote board extension 54 on the main mote board 38 either inwardly or outwardly in accordance with the direction of movement of the said operating arm 66. By shifting the mote board extension 54 on the mote board 38 the inner concave wall 36 may be brought closer to or shifted outwardly from the brush cylinder 7ᵃ and likewise be brought closer to or farther away from the saw cylinder, and, furthermore, the point 57 of the mote board extension may be elevated or depressed and the various conditions attending the ginning of different kinds of seed cotton may be met to the best advantage and a more effective operation relatively to the lint may be performed so that the lint may be made as clean as desired. The mote board 38 and extension 54 work in conjunction with the seal board 70 depending from the top frame of the machine between the saw cylinder 7 and brush cylinder 7ᵃ, said seal board having its lower end reduced and extending downwardly closely between the two cylinders.

What is claimed is:

1. The combination with a machine for operating on cotton and including a saw cylinder, of mechanism for elevating and throwing the saw cylinder outwardly from the machine and conversely for moving the saw cylinder into the machine and lowering it to its applied position, the said mechanism forming a part of the machine equipment.

2. The combination with a machine for operating on seed cotton and including a saw cylinder and a hinged breast, of mechanism forming a part of the equipment of the machine and operative to open and close the breast and to displace and replace the saw cylinder.

3. The combination with a machine for operating on cotton and including a saw cylinder and a hinged breast, of mechanism forming a part of the equipment of the machine and operative to open the breast and elevate and project the saw cylinder exteriorly of the machine.

4. The combination with a machine for operating on seed cotton including a saw cylinder, of mechanism forming a part of the equipment of the machine and disposed to engage the shaft extremities of the cylinder to vertically move and swing the said cylinder outwardly and inwardly from and into the machine.

5. The combination with a machine for operating on cotton including a saw cylinder, of mechanism forming a part of the equipment of the machine and disposed to engage the under portion of opposite extremities of the cylinder and to elevate and depress the latter and also to move the said cylinder outwardly and inwardly relatively to the machine, the said mechanism embodying automatic locking and releasing means to regulate the vertical movement thereof.

6. The combination with a machine for operating on cotton including a saw cylinder and a hinged breast, of mechanism for simultaneously opening the breast and engaging the cylinder and for lifting the cylinder from its bearing devices and projecting the said cylinder outwardly from the machine.

7. The combination with a machine for operating upon cotton including a saw cylinder, of mechanism forming a part of the equipment of the machine for engaging, lifting and throwing the cylinder outwardly from the machine and also to reversely move the cylinder into and downwardly in place within the machine, the said mechanism being actuated by a single operator.

8. The combination with a machine for operating upon cotton and embodying a saw cylinder, of mechanism forming a part of the equipment of the machine and operative by a single operator to remove and replace the saw cylinder.

9. The combination with a machine for operating upon cotton and embodying a saw cylinder, of elevatable and depressible fork members for engaging opposite extremities of the saw cylinder to raise and lower the latter from and to its applied position and also to outwardly and inwardly move the cylinder relatively to the machine, and means controlled by a single operator for actuating the said fork members.

10. The combination with a machine for operating upon cotton and embodying a saw cylinder, of elevatable and depressible devices for engaging the saw cylinder, the said devices also having outward and inward swinging movements, and means coöperating with the said devices for actuating the same and including locks for holding the devices against vertical movement when fully elevated.

11. The combination with a machine for operating upon cotton including a saw cylinder, of movable devices for engaging the saw cylinder and raising and lowering and supporting said cylinder while swung outwardly and inwardly, and operating mechanism for said devices and including locking means to hold the devices against movement when they shall have reached their highest elevation.

12. The combination with a machine for operating upon cotton including a saw cylinder and a hinged roll box, of mechanism for preliminarily opening the roll box and vertically moving and outwardly swinging the saw cylinder and also for inwardly moving and depressing the cylinder to its place, the roll box being closed subsequent to the disposition of the cylinder in place in the machine.

13. The combination with a cotton treating machine having ginning devices including saw and brush cylinders, of a mote board bodily adjustable upwardly and downwardly and carrying an extension independently adjustable longitudinally between the cylinders.

14. The combination with a cotton treating machine having ginning devices including saw and brush cylinders, of an upwardly and downwardly bodily adjustable mote board having an extension with a reduced extremity independently adjustable longitudinally between the cylinders.

15. The combination with a cotton treating machine having ginning devices including saw and brush cylinders, of an adjustable mote board having an extension thereon provided with a reduced extremity longitudinally adjustable between the cylinders independently of the adjustment of the mote board as a whole.

16. The combination with a cotton treating machine having ginning devices including saw and brush cylinders, of an adjustable mote board having an independently adjustable extension longitudinally shiftable with relation to the remaining portion of the mote board between and toward and from the cylinders.

17. The combination with a cotton ginning machine including saw and brush cylinders, of a mote board independently adjustable vertically toward and from the cylinders and carrying an independently adjustable extension having a reduced extremity movable between the cylinders and also provided with an inner curved wall adjacent to the brush cylinder.

18. The combination with a cotton ginning mechanism including saw and brush cylinders, of a mote board organization embodying a main board vertically movable toward and from the cylinders and carrying a normally fixed extension with a reduced extremity longitudinally adjustable between the cylinders, the extension being adjustable over the main board.

In testimony whereof I have hereunto set my hand in presence of two subscribing witnesses.

WARNER H. CAMP.

Witnesses:
F. M. NASH,
F. G. CHAPPELL.